US008416147B2

(12) United States Patent
Martch et al.

(10) Patent No.: US 8,416,147 B2
(45) Date of Patent: Apr. 9, 2013

(54) SYSTEMS, METHODS AND APPARATUS FOR MOUNTING AN OBJECT TO A STRUCTURE

(75) Inventors: Henry Gregg Martch, Parker, CO (US); Jason Fruh, Lone Tree, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 718 days.

(21) Appl. No.: 12/639,814

(22) Filed: Dec. 16, 2009

(65) Prior Publication Data

US 2011/0140985 A1 Jun. 16, 2011

(51) Int. Cl.
*H01Q 1/12* (2006.01)
*F16L 3/00* (2006.01)

(52) U.S. Cl.
USPC ......... 343/878; 343/882; 248/121; 248/309.1

(58) Field of Classification Search .................. 343/878, 343/880, 882; 248/121, 274.1, 219.4, 309.1
See application file for complete search history.

(56) References Cited

U.S. PATENT DOCUMENTS

| | | | | |
|---|---|---|---|---|
| 3,525,493 | A | 8/1970 | Chrietzberg et al. | |
| 4,595,165 | A | 6/1986 | Klingensmith | |
| 5,746,029 | A | 5/1998 | Ullman | |
| 5,926,151 | A * | 7/1999 | Hagiwara et al. | 343/882 |
| 6,709,184 | B1 | 3/2004 | McDonald | |
| 6,864,855 | B1 * | 3/2005 | Fujita | 343/882 |
| 2002/0005817 | A1 | 1/2002 | Wanat | |
| 2004/0027309 | A1 | 2/2004 | Swarup | |
| 2005/0052335 | A1 * | 3/2005 | Chen | 343/878 |
| 2005/0252155 | A1 | 11/2005 | Weir | |
| 2009/0096689 | A1 | 4/2009 | Krajicek | |
| 2012/0162044 | A1 * | 6/2012 | Lettkeman et al. | 343/880 |

FOREIGN PATENT DOCUMENTS

WO 0213314 A2 2/2002

OTHER PUBLICATIONS

International Searching Authority, Search Report and Writtten Opinion for PCT/US2010/060710 mailed on Apr. 15, 2011.

* cited by examiner

*Primary Examiner* — Tan Ho
(74) *Attorney, Agent, or Firm* — Seed IP Law Group PLLC

(57) ABSTRACT

Systems, methods and apparatus are described for mounting objects to a structure, such as a wall or roof of a home. One embodiment is a mounting apparatus that includes a base configured to attach to a structure and mount an object to the structure. The apparatus further includes at least one load applying member attached to the base configured to apply a preload force to the structure. The load applying member includes a loading plate and a plurality of force applying members attached to the loading plate. The force applying members apply a preload force to a surface of the structure during mounting of the object to the structure.

21 Claims, 8 Drawing Sheets

SYSTEMS, METHODS AND APPARATUS FOR MOUNTING AN OBJECT TO A STRUCTURE

BACKGROUND

Small satellite dishes may be mounted to the outside of a structure, such as a home and allow a viewer to receive communication services, such as television programming, via a communication satellite. The typical satellite dish installation includes a satellite antenna reflector that collects signals and reflects the signals towards a low noise block (LNB) downconverter or low noise block feedhorn (LNBF) downconverter. The signals are then input to a satellite receiver, such as a set-top box, for processing and output to the user. Satellite communications depend on a direct line of sight between a satellite antenna associated with the satellite dish and thus accuracy of alignment with the satellite is important. Typically, the satellite antenna is mounted to a rigid portion of the structure, such as the roof or sidewall of a home. However, forces applied to the satellite antenna may cause misalignment of the satellite dish, causing the satellite receiver to lose the television signal. For instance, wind forces applied to the satellite dish can cause movement and misalignment of the satellite antenna. More particularly, movement of the satellite dish can cause deformation of the underlying material of the structure, causing the satellite dish to become misaligned in a particular direction. Thus, it is desirable for more rigid mounting of satellite dishes and other objects in order to minimize the possibility of misalignment of the satellite antenna.

BRIEF DESCRIPTION OF THE DRAWINGS

The same number represents the same element or same type of element in all drawings.

DETAILED DESCRIPTION OF THE DRAWINGS

Described herein are systems, methods and apparatus for mounting objects to a structure, such as a wall or roof of a home. More particularly, described herein are techniques for applying a preload force to a structure during install of the object (e.g., a satellite dish antenna) such that the material comprising the underlying structure becomes compressed and is thus less susceptible to later compression/deformation due to external forces applied to the object. Thus, because the object is mounted to a material that is preloaded, the material is less likely to deform, causing misalignment of the mounted object.

At least one embodiment described herein is an apparatus for mounting an object to a structure. The apparatus includes a base configured to attach to a structure and mount the object to the structure. The apparatus further includes at least one load applying member attached to the base configured to apply a preload force to the structure. The force applying member includes a loading plate and a plurality of force applying members attached to the loading plate. In at least one embodiment, each force applying member comprises a threaded member threadably attached to the loading plate having a foot configured to press against the structure upon application of a torque to the threaded member. However, other force applying members, such as springs, pistons or the like may also be utilized in accordance with the teachings described herein.

The mounted object will be described herein in the context of a satellite dish antenna. In at least one embodiment, a satellite dish antenna may include a mounting arm, a satellite antenna reflector and a satellite antenna (e.g., an LNB or LNBF). However, it is to be appreciated that the techniques described herein may be applied for mounting any type of object to a structure, including outdoor lighting and security cameras.

Figure 1:
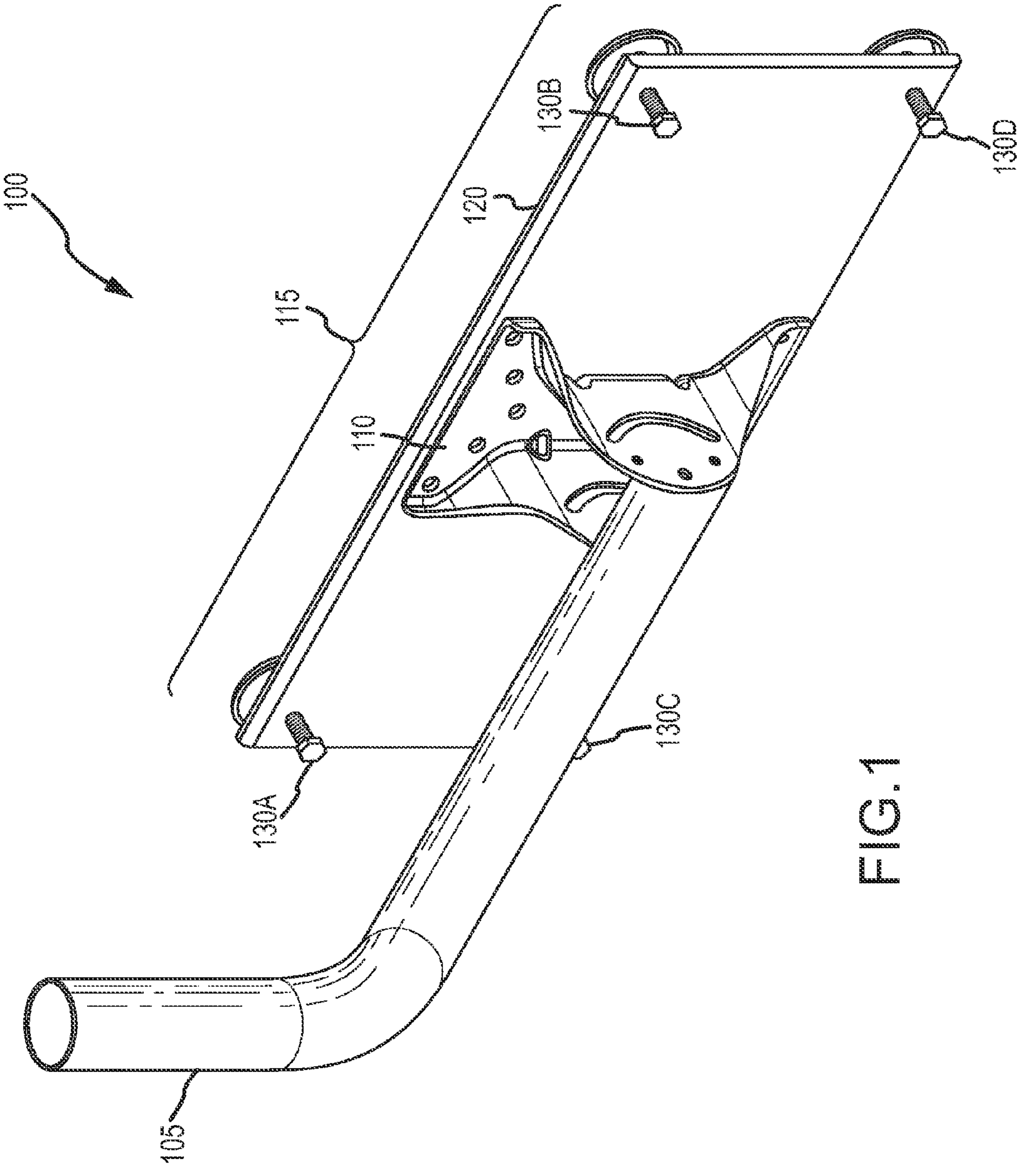
FIG. 1 illustrates a perspective view of an embodiment of a satellite antenna mounting system.
Figure 2:
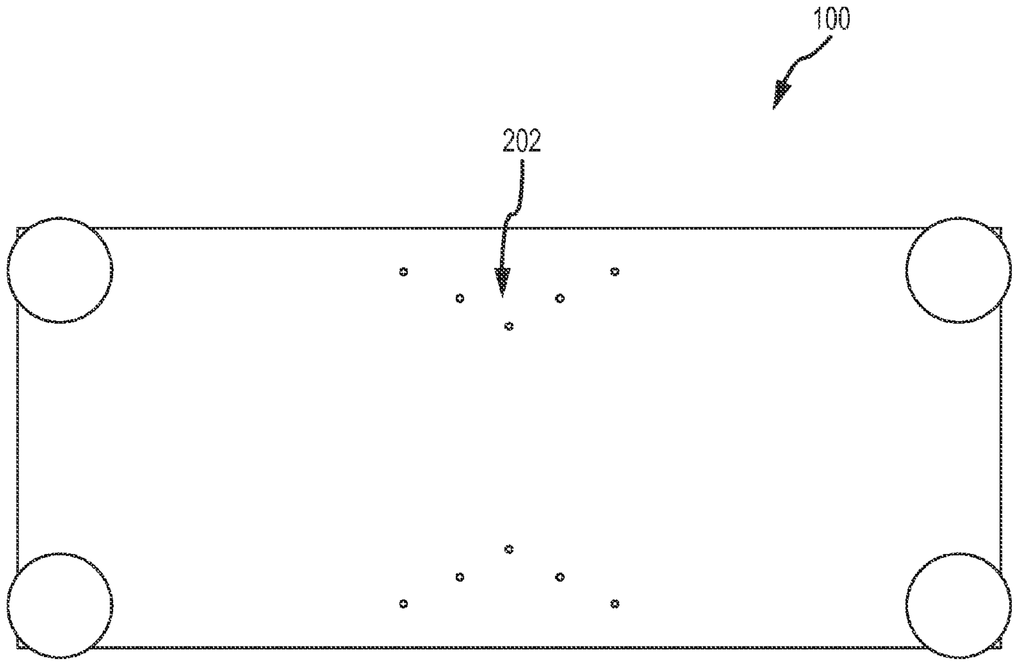
FIG. 2 illustrates a back view of the satellite antenna mounting system of FIG. 1.
Figure 3:
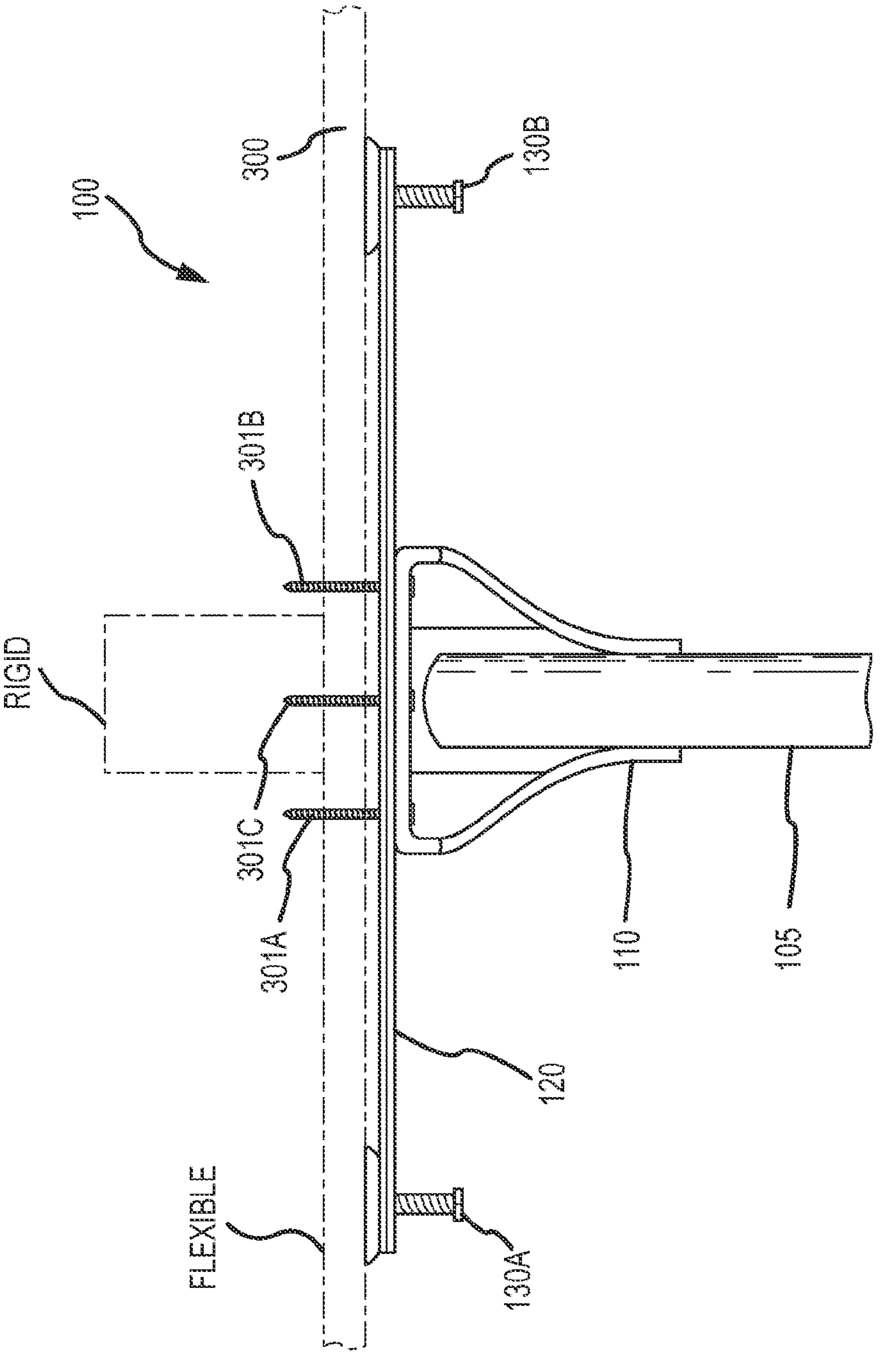
FIG. 3 illustrates a top down view of the satellite antenna mounting system of FIG. 1.

FIG. 1 illustrates a perspective view of an embodiment of a satellite antenna mounting system 100. FIG. 2 illustrates a back view of the satellite antenna mounting system 100 of FIG. 1. FIG. 3 illustrates a top down view of the satellite antenna mounting system 100 of FIG. 1. The system 100 is configured to mount an object, such as a satellite dish antenna (not shown in FIGS. 1-3) to a structure 300. The system 100 includes a mounting arm 105, a base 110 and a load applying member 115. The load applying member 115 includes a loading plate 120, a plurality of force applying members 130A-D and a plurality of openings 202. The system 100 also includes one or more fasteners 301A-301B. Each of these components is discussed in greater detail below. The system 100 of FIGS. 1-3 may include other components, elements or devices not illustrated for the sake of brevity.

The system 100 includes a mounting arm 105 communicatively coupled to a satellite antenna reflector and satellite antenna (e.g., an LNB or LNBF). The satellite antenna and the satellite antenna reflector are not shown in FIGS. 1-3. The mounting arm 105 is adjustably connected to a base 110 which is utilized to attach the mounting arm 105 and other components of the satellite dish (e.g., the reflector and the LNBF) to the outside of the structure 300. In the illustrated embodiment, the base 110 is a satellite antenna foot that is typically utilized to mount a satellite dish antenna to the side of a structure 300. As illustrated in FIG. 1, the orientation of the mounting arm 105 may be adjusted such that the satellite dish can be mounted on the side or roof of a structure 300 at any desirable location depending on desired design criteria.

In the illustrated embodiment, the load applying member 115 is coupled to the bottom of the base 110. More particularly, the load applying member 115 includes a loading plate 120 coupled to the base 110. The loading plate 120 and the bottom of the base 110 may be attached using any appropriate means. In at least one embodiment, the base 110 may be physically coupled to the loading plate 120 (e.g., via welding, glue or the like). In other embodiments, the base 110 may be coupled to the loading plate 120 via fasteners, such as screws, bolts or the like.

The loading plate 120 may include a plurality of openings 202 to allow securing of the base 110 to the structure 300 via appropriate fasteners. The openings 202 may be configured to align with similar openings on the bottom of the base 110. For example, the base 110 may be physically attached to the structure 300 via one or more fasteners 301A-301B, such as threaded fasteners, nails, bolts or the like. In at least one embodiment, the fasteners 301A-301C are additionally utilized to secure the base 110 to the loading plate 120.

The system 100 also includes a plurality of force applying members 130A-130D that are configured to apply a preload force to the structure 300 during installation. When the system 100 is mounted against the structure 300, the force applying members 130A-130D are engaged to apply the preload force to the structure 300, compressing the underlying material of the structure 300. Thus, the underlying material of the structure 300 becomes less susceptible to deformation later when external forces, such as wind, are applied to the satellite dish antenna. In the illustrated embodiment, the load applying member 115 comprises four force applying members 130A-130D positioned proximate each corner of the load applying member 115. However, it is to be appreciated that any number of force applying members 130A-130B positioned at any appropriate location on the loading plate 120 may be utilized in accordance with the teachings described herein.

The force applying members 130A-130D may be an appropriate apparatus that can be engaged to apply a preload force to the structure 300. In at least one embodiment, the force applying members 130A-130D are each threaded members which are threadably attached to the loading plate 120. More particularly, the threaded members are configured to apply a preload force to the structure 300 upon application of a torque to the threaded members. In at least one embodiment, the threaded members each have a foot that is configured to press against the structure upon application of the torque to the threaded members. The feet attached to the threaded members allow the preload force to be applied over a larger surface area of the structure 300 and further prevents puncturing of the structure 300 surface by the force applying members 130A-130D. The feet may be sized appropriately in order to spread the preload force over a desired surface area of the structure 300. In other embodiments, the force applying members 130A-130D may comprise springs, pistons or the like which are configured upon engagement to apply a similar preload force to the surface of the structure 300.

Figure 4:
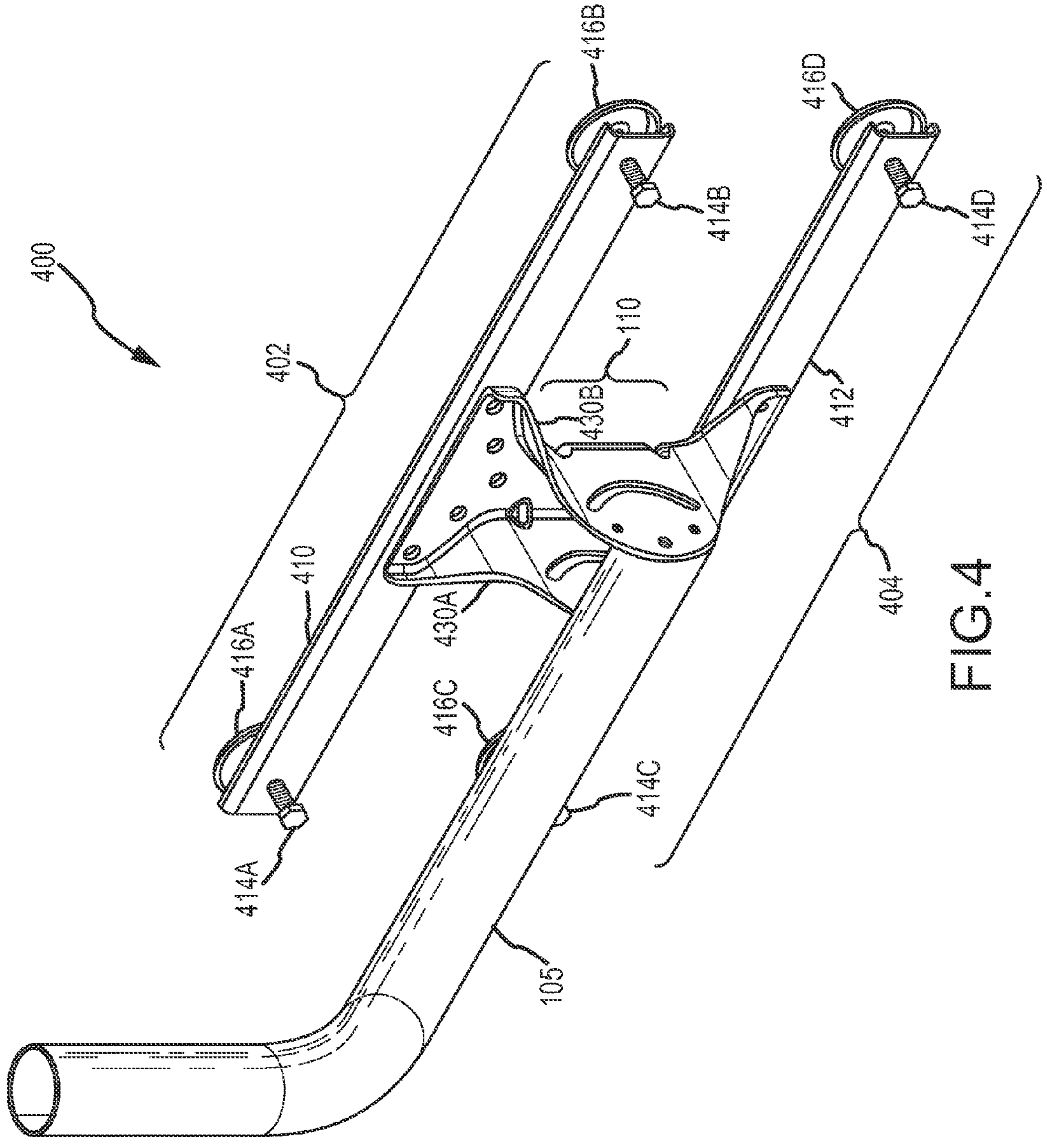
FIG. 4 illustrates a perspective view of another embodiment of a satellite antenna mounting system.
Figure 5:
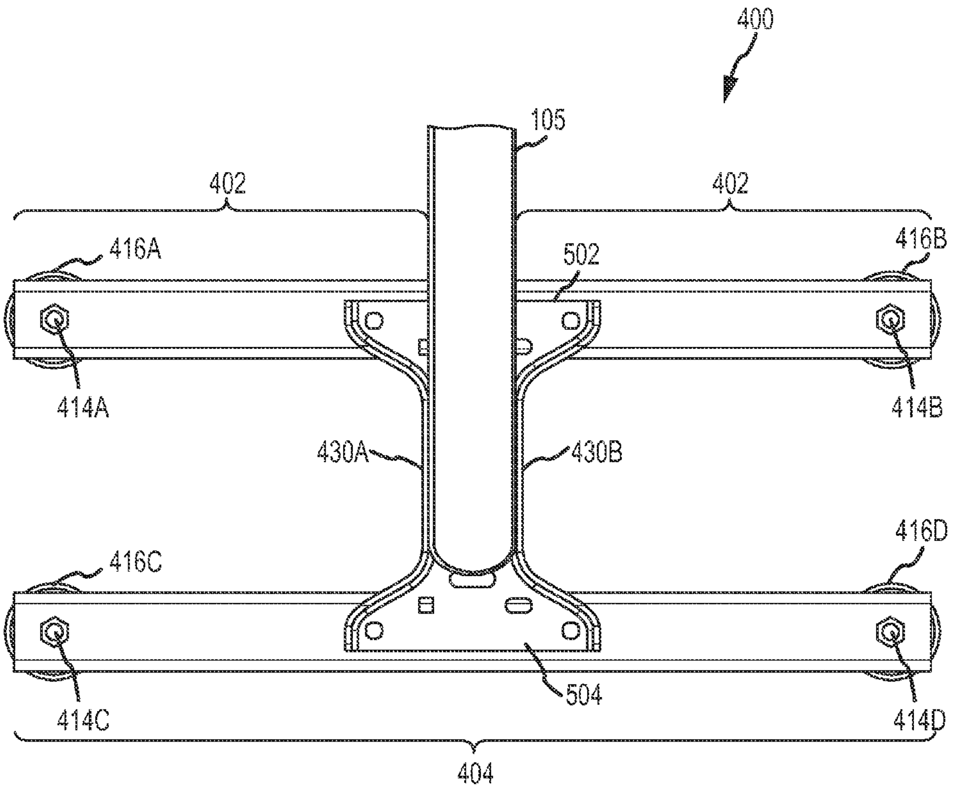
FIG. 5 illustrates an elevation view of the satellite antenna mounting system of FIG. 4.
Figure 6:
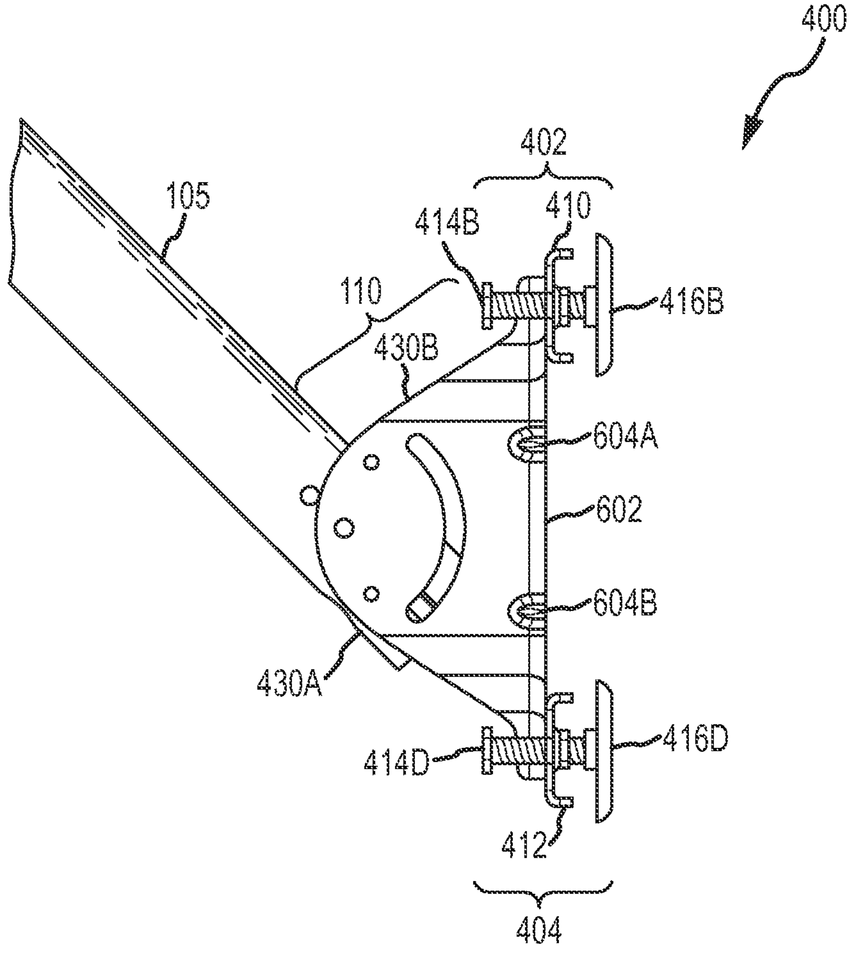
FIG. 6 illustrates a side view of the satellite antenna mounting system of FIG. 4.
Figure 7:
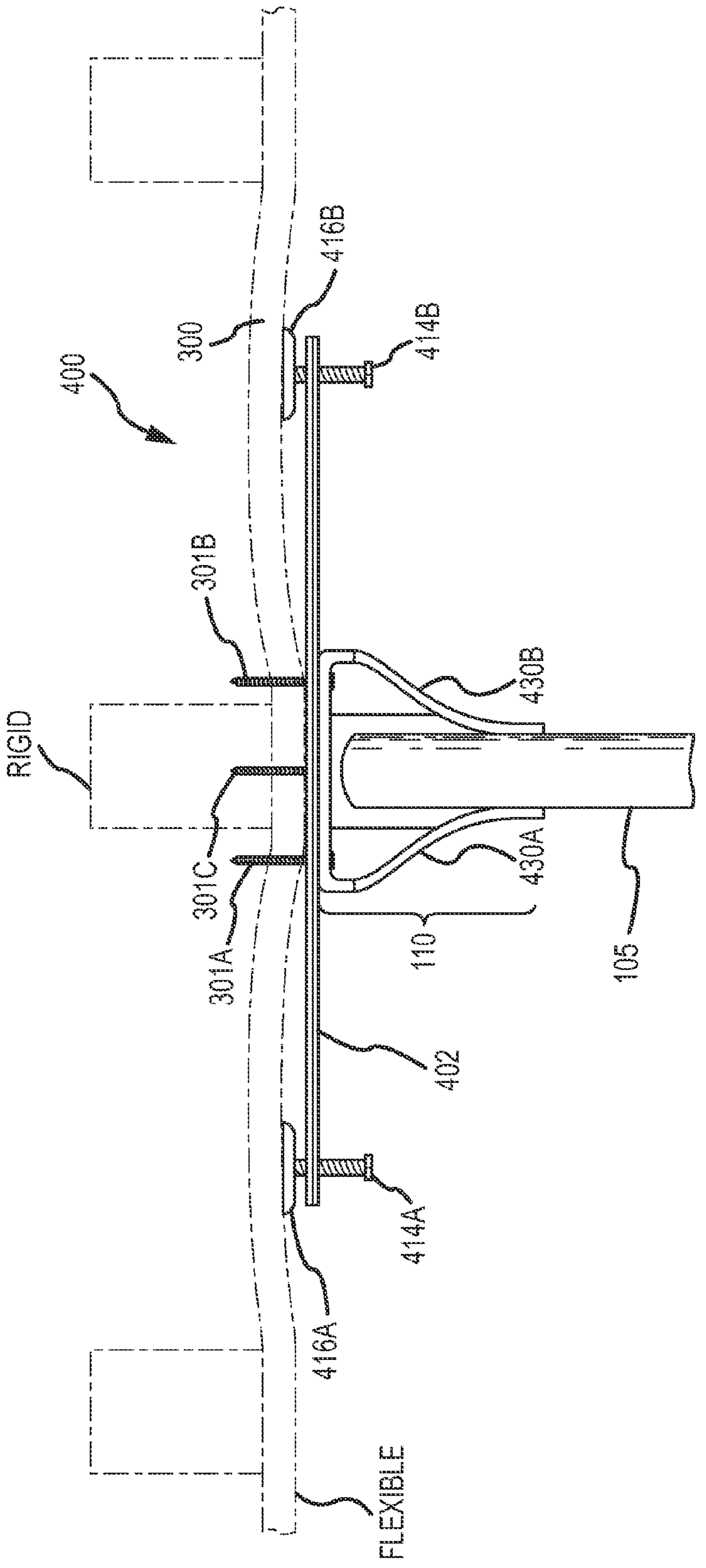
FIG. 7 illustrates a top view of the satellite antenna mounting system of FIG. 4.

FIG. 4 illustrates a perspective view of another embodiment of a satellite antenna mounting system 400. FIG. 5 illustrates an elevation view of the satellite antenna mounting system 400 of FIG. 4. FIG. 6 illustrates a side view of the satellite antenna mounting system 400 of FIG. 4. FIG. 7 illustrates a top view of the satellite antenna mounting system 400 of FIG. 4. The system 400 includes a mounting arm 105, a base 110, a first load applying member 402 and a second load applying member 404. The first load applying member 402 includes a first loading plate 410, a plurality of threaded members 414A-414B and a plurality of feet 416A-416B. The second load applying member 404 includes a second loading plate 412, a plurality of threaded members 414C-414D and a plurality of feet 416C-416D. Each of these components is discussed in greater detail below. The system 400 of FIGS. 4-6 may include other components, elements or devices not illustrated for the sake of brevity.

Like the system 100 of FIG. 1, the system 400 includes a mounting arm 105 that couples a satellite dish antenna (not visible in FIGS. 4-6) to a base 110. The base 110 is further coupled to the first and second load applying members 402 and 404. In the illustrated embodiment of FIG. 4, the base 110 has a first enlarged portion 502 attached to the first load applying member 402 and a second enlarged portion 504 attached to a second load applying member 404. The first load applying member 402 and the second load applying member 404 are mounted on the base 110 generally parallel with one another. In at least one embodiment, the system 400 may include a single load applying member 402 attached to the base 110 (e.g., the system 400 does not include the load applying member 404).

The mounting arm 105 is coupled to the base 110 at a location between the first and second enlarged portions 502 and 504. In at least one embodiment, a portion of the mounting arm 105 is orientated generally perpendicular to the structure 300 (see FIG. 7). This may occur for example when the system 400 is mounted on a generally flat roof. In at least one embodiment, a portion of the mounting arm 105 is orientated generally parallel to the structure 300, such as when the system 400 is mounted on a wall of the structure 300.

The base 110 includes a mounting plate 602 having a planar surface configured to abut a structure 300. The mounting plate 602 includes a plurality of openings 604A-604B for fasteners 301A-301C there through to mount the satellite dish antenna to the structure 300. For example, the base 110 may be attached to a stud of the structure 300 via a one or more threaded fasteners 301C placed through the openings 604A-604B. Other fasteners 301A-301B may be utilized to attach the system 400 to less rigid areas of the structure 300. The base 110 also includes a plurality of adjustable plates 430A and 430B for receiving the adjustably connected mounting arm 105.

The first load applying member 402 includes a first loading plate 410, a plurality of threaded members 414A-414B and a plurality of feet 416A-416B. The first loading plate 410 is mounted generally perpendicular to the base 110 and is further orientated generally parallel to a surface of the structure 300. More particularly, a first side of the loading plate 410 is coupled to the base 110 and a second side of the loading plate 410 abuts a wall of a structure 300. In at least one embodiment, the first loading plate 410 includes an elongated channel that abuts the structure 300.

Similarly, the second load applying member 404 includes a second loading plate 412, a plurality of threaded members 414C-414D and a plurality of feet 416C-416D. The second loading plate 412 is mounted generally parallel to the first loading plate 410 and generally perpendicular to the base 110. The second loading plate 412 may also include an elongated channel that abuts the structure 300.

In the illustrated embodiment, there are four threaded members 414A-414D each positioned proximate opposing ends of the first or second loading plates 410 and 412. However, any number of threaded members 414A-414D may be utilized in accordance with the teachings described herein. Further, the threaded members 414A-414D may be positioned at any appropriate location along the surface of the first and second loading plates 410 and 412.

A torque is applied to each of the threaded members 414A-414D, causing the threaded members 414A-414D to apply a preload force to the surface of the structure 300. More particularly, the feet 416A-416D press against the structure upon application of the torque to the threaded members 414A-414D, compressing the underlying material of the structure 300 as illustrated in FIG. 7. Thus, the satellite dish antenna has increased rigidity compared with an installation that mounts the satellite dish to a structure using a standard mounting foot.

Figure 8:
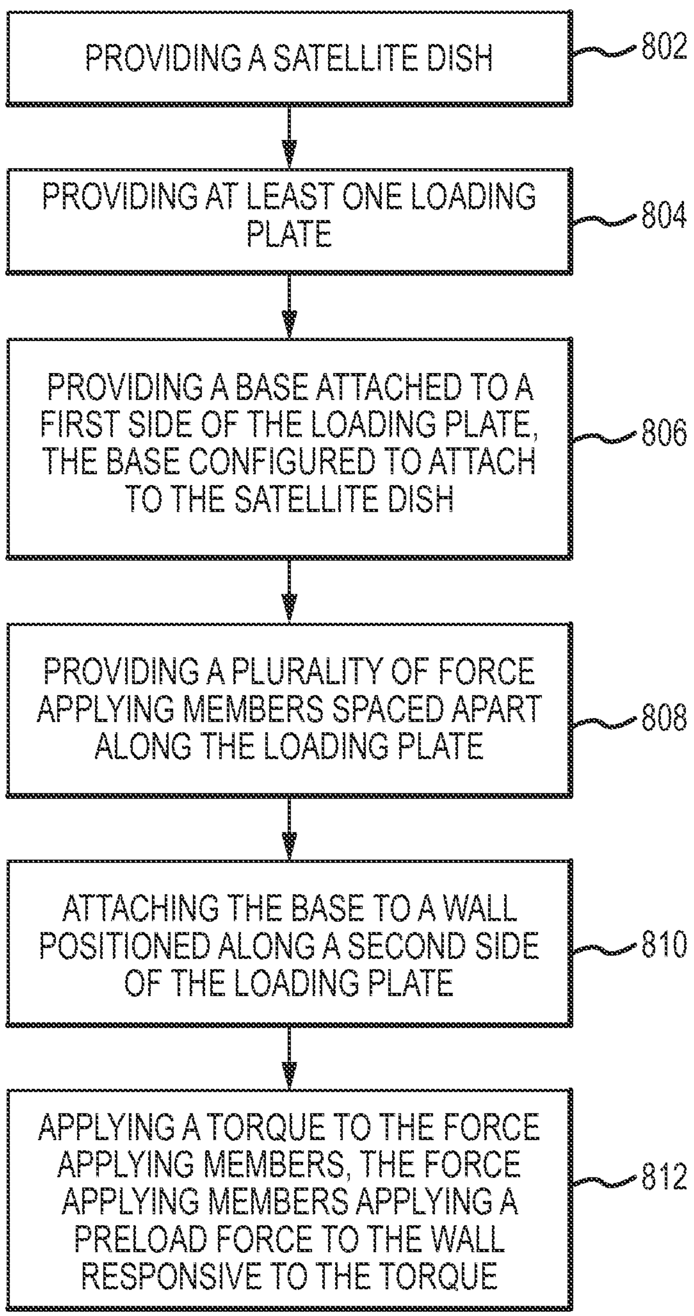
FIG. 8 illustrates an embodiment of a process for installing a satellite dish to a structure.

FIG. 8 illustrates an embodiment of a process for mounting an object to a structure. More particularly, the process of FIG. 8 is described in the context of installing a satellite dish to a structure. However, the process may be applied to mount other objects to a structure. The process may include other operations not illustrated for the sake of brevity.

The process includes providing a satellite dish (operation 802), providing at least one loading plate (operation 804), providing a base attached to a first side of the loading plate, the base configured to attach to the satellite dish (operation 806) and providing a plurality of force applying members spaced apart along the loading plate (operation 808). The process further includes attaching the base to a wall positioned along a second side of the loading plate (operation 810) and applying a torque to the force applying members, the force applying members applying a preload force to the wall responsive to the torque (operation 812).

Although specific embodiments were described herein, the scope of the invention is not limited to those specific embodiments. The scope of the invention is defined by the following claims and any equivalents therein.

We claim:

1. An apparatus for mounting an object to a structure, the apparatus comprising:

a base configured to attach to the structure and mount the object to the structure; and at least one load applying member attached to the base configured to apply a preload force to the structure, the at least one load applying member comprising a loading plate and a plurality of force applying members attached to the loading plate to apply the preload force to the structure in a direction normal to the loading plate.

2. The apparatus of claim 1, wherein each force applying member comprises a threaded member threadably attached to the loading plate having a foot configured to press against the structure upon application of a torque to the threaded member.

3. The apparatus of claim 1, wherein the load applying member comprises at least two threaded members positioned on opposing edges of the loading plate.

4. The apparatus of claim 1 further comprising:

a mounting arm adjustably attached to the base and configured to attach to the object.

5. The apparatus of claim 4, further comprising a satellite antenna reflector coupled to the mounting arm.

6. An apparatus for mounting an object to a structure, the apparatus comprising:

a base configured to attach to the structure and mount the object to the structure; and at least one load applying member attached to the base configured to apply a preload force to the structure, the at least one load applying member comprising a loading plate and a plurality of force applying members attached to the loading plate, and wherein the load applying member comprises four threaded members positioned proximate each corner of the loading plate.

7. An apparatus for mounting an object to a structure, the apparatus comprising:

a base configured to attach to the structure and mount the object to the structure;

a mounting arm adjustably attached to the base and configured to attach to the object; and a first load applying member and a second load applying member each attached to the base and configured to apply a preload force to the structure, each of the first load applying member and the second load applying member comprising a loading plate and a plurality of force applying members attached to the loading plate, and wherein the base has a first enlarged portion attached to the first load applying member and a second enlarged portion attached to the second load applying member generally parallel to the first load applying member.

8. The apparatus of claim 7, wherein the mounting arm is located between the first enlarged portion and the second enlarged portion, at least a portion of the mounting arm being generally perpendicular to the structure.

9. The apparatus of claim 7, wherein the base comprises a mounting plate having a planar surface configured to abut the structure with a plurality of openings for fasteners there through and an adjustable plate attached to the mounting plate generally orthogonal to the planar surface configured to attach the mounting arm to the base.

10. The apparatus of claim 9, wherein the loading plate comprises an elongated channel having first and second force applying members attached to the opposing ends thereof.

11. The apparatus of claim 10, further comprising a plurality of threaded fasteners configured to attach the base to the structure.

12. A system comprising:

a satellite antenna reflector;

a mounting arm attached to the satellite antenna reflector;

a base attached to the mounting arm;

a first loading plate having a first side attached to the base;

a second loading plate having a first side attached to the base, the second loading plate being spaced apart from the first loading plate;

at least one fastener attaching the base to a wall positioned along second sides of the first and second loading plates;

a plurality of first force applying members spaced apart along the first loading plate;

a plurality of second force applying members spaced apart along the second loading plate; and each of the first and second force applying members configured to apply a preload force to the surface of the wall.

13. The system of claim 12, wherein the first and second force applying members are configured to apply the preload force to the surface responsive to application of a torque on the first and second force applying members.

14. The system of claim 12, wherein each force applying member comprises a threaded member threadably attached to the loading plates having a foot configured to press against the structure upon application of the torque.

15. The system of claim 14, wherein the base has a first enlarged portion attached to the first loading plate and a second enlarged portion attached to the second loading plate generally parallel to the first loading plate.

16. The system of claim 15, wherein the mounting arm is located between the first enlarged portion and the second enlarged portion, at least a portion of the mounting arm being generally perpendicular to the structure.

17. The system of claim 12, wherein the first and second loading plates each comprise an elongated channel having first and second force applying members attached to the opposing ends thereof.

18. The system of claim 12, wherein each of the plurality of first and second force applying members are configured to apply a preload force to the surface of the wall in a direction normal to the first and second loading plates.

19. A method of installing a satellite dish, the method comprising:

providing a satellite dish;

providing at least one loading plate;

providing a base attached to a first side of the loading plate, the base configured to attach to the satellite dish;

providing a plurality of force applying members spaced apart along the loading plate;

attaching the base to a wall positioned along a second side of the loading plate;

and applying a torque to the force applying members, the force applying members applying a preload force to the wall responsive to the torque.

20. The method of claim 19, wherein each of the force applying members comprises a threaded member threadably attached to the loading plate having a foot configured to press against the structure and wherein applying the torque further comprises:

applying a torque to each of the force applying members to apply the preload force to the wall.

21. The method of claim 19, wherein applying the torque to the force applying members includes applying the torque to the force applying members to apply the preload force to the wall in a direction normal to the loading plate.

* * * * *